US008243166B2

(12) United States Patent
Kumar et al.

(10) Patent No.: US 8,243,166 B2
(45) Date of Patent: Aug. 14, 2012

(54) AUTOMATIC DETECTION OF BLOCKED FIELD-OF-VIEW IN CAMERA SYSTEMS

(75) Inventors: Santosh Kumar, Endwell, NY (US); Mark D. Goodwin, Apalachin, NY (US); Thomas Musa, Endicott, NY (US); James Howard, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 679 days.

(21) Appl. No.: 12/356,472

(22) Filed: Jan. 20, 2009

(65) Prior Publication Data

US 2010/0182450 A1    Jul. 22, 2010

(51) Int. Cl.
*H04N 5/235*    (2006.01)
*H04N 5/76*    (2006.01)

(52) U.S. Cl. .................. 348/229.1; 348/231.3
(58) Field of Classification Search .................. None
See application file for complete search history.

(56) References Cited

U.S. PATENT DOCUMENTS

| 4,356,390 A | 10/1982 | Feilchenfeld |
| 5,396,476 A | 3/1995 | Asthana |
| 5,799,108 A | 8/1998 | Okahashi |
| 6,566,646 B1 | 5/2003 | Iwakawa |
| 6,940,554 B2 | 9/2005 | Robins et al. |
| 7,130,468 B1* | 10/2006 | Meyer et al. .................. 382/219 |
| 2002/0126899 A1* | 9/2002 | Farrell .......................... 382/199 |
| 2004/0169745 A1 | 9/2004 | Franz |
| 2007/0030378 A1 | 2/2007 | Aoyama |
| 2008/0240608 A1* | 10/2008 | Ishii ............................ 382/275 |

FOREIGN PATENT DOCUMENTS

| JP | 9222382 | 8/1997 |
| JP | 2000292366 | 10/2000 |
| JP | 2001109047 | 4/2001 |
| JP | 2001119614 | 4/2001 |
| JP | 2003050212 | 2/2003 |
| JP | 2005072767 | 3/2005 |
| JP | 200602012 | 1/2006 |

* cited by examiner

*Primary Examiner* — Luong T Nguyen
(74) *Attorney, Agent, or Firm* — Wolf, Greenfield & Sacks, P.C.

(57) ABSTRACT

Methods and apparatus for detecting a blockage in the field-of-view of a camera in an image capture system by monitoring changes in the quality of images captured by the camera. As an image is acquired by the camera, intensity values for pixels in the acquired image are determined and stored in a data structure in memory of the camera. Image statistics are calculated based in part on the intensity values for pixels in the currently acquired image and at least some previous images acquired by the camera. If the image statistics satisfy at least one predetermined alert criterion, an alert is triggered. In response to triggering an alert, an alert sensor included as part of the camera is activated to indicate to a user of the image capture system that a possible blockage in the field-of-view of the camera has been detected.

20 Claims, 6 Drawing Sheets

AUTOMATIC DETECTION OF BLOCKED FIELD-OF-VIEW IN CAMERA SYSTEMS

TECHNICAL FIELD

The invention relates generally to the assessment of image quality, and more specifically to the automatic detection of a blocked field-of-view in linescan camera systems.

BACKGROUND

With repetitive use, the lens of a camera may become dirty, resulting in a degraded image quality for images captured with the camera. For example, linescan camera systems capture images of objects as they pass in front of a camera capture window. As objects continue to pass the camera, obstructions and debris may collect on the camera capture window leading to degraded quality images. The resultant degradation to image quality may adversely impact the performance of a system in which the camera is integrated.

A conventional method of detecting a blocked field-of-view of a camera in an imaging system includes waiting until performance of the system drops below a predetermined threshold. When the performance drops below the threshold, a user must manually investigate why the system performance has decreased. For example, the user decides whether or not the performance decrease is due related to a problem with the camera or with another part of the system. When examining the camera, the user may determine that the capture window of the camera is obscured by dirt or debris and suitable maintenance (e.g., removal of the dirt or debris) is performed to restore the system to a proper operating condition.

SUMMARY

An embodiment of the invention is directed to a method of detecting a change in a quality of images captured by a linescan camera. The method comprises acts of: (A) storing, in at least one first data structure, first intensity values determined for pixels in a So first image of at least one object acquired by the linescan camera; (B) calculating at least one first statistic based at least in part on at least some of the first intensity values stored in the at least one first data structure; (C) calculating at least one second statistic based at least in part on the at least one first statistic and at least one third statistic previously stored on the linescan camera; and (D) triggering an alert when the at least one second statistic satisfies at least one predetermined alert criterion.

Another embodiment of the invention is directed to a computer readable medium encoded with a series of instructions that when executed on a computer, perform a method. The method comprises storing, in at least one data structure, first intensity values determined for pixels in a first image of at least one object acquired by a linescan camera; calculating at least one first statistic based at least in part on at least some of the first intensity values stored in the at least one data structure; calculating at least one second statistic based at least in part on the at least one first statistic and at least one third statistic previously stored on the linescan camera; and triggering an alert upon determining that the at least one second statistic satisfies at least one predetermined alert criterion.

Another embodiment of the invention is directed to an image capture system including at least one camera. The at least one camera comprises an image capture module for acquiring at least one image of at least one object; at least one storage medium for storing at least one computer program and at least one data structure; an alert sensor for receiving an alert message and displaying an alert; and a processor for executing a series of instructions specified in the at least one computer program to perform a method. The method comprises storing, in the at least one data structure, first intensity values determined for pixels in a first image acquired by the image capture module; calculating at least one first statistic based at least in part on at least some of the first intensity values stored in the at least one data structure; calculating at least one second statistic based at least in part on the at least one first statistic and at least one third statistic previously stored on the at least one storage medium; and transmitting an alert message from the processor to the alert sensor when the at least one second statistic satisfies at least one predetermined alert criterion.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings.

DETAILED DESCRIPTION

The present disclosure generally relates to inventive methods and apparatus for assessing the quality of an image captured by a camera to determine if the field-of-view of the camera is obscured by dirt or debris. Applicants have recognized and appreciated that conventional methods of identifying a blocked field-of-view of a camera in an image capture system may be improved by incorporating an automatic analysis and alert system into the image capture system. In contrast to conventional approaches where a user must manually inspect the image capture system to determine a cause of a performance decrease in the system, automated image quality detection methods and apparatus, according to embodiments of the invention, monitor the quality of images acquired by the image capture system to detect a potential decrease in system performance prior to the performance of the system actually decreasing.

Figure 1:
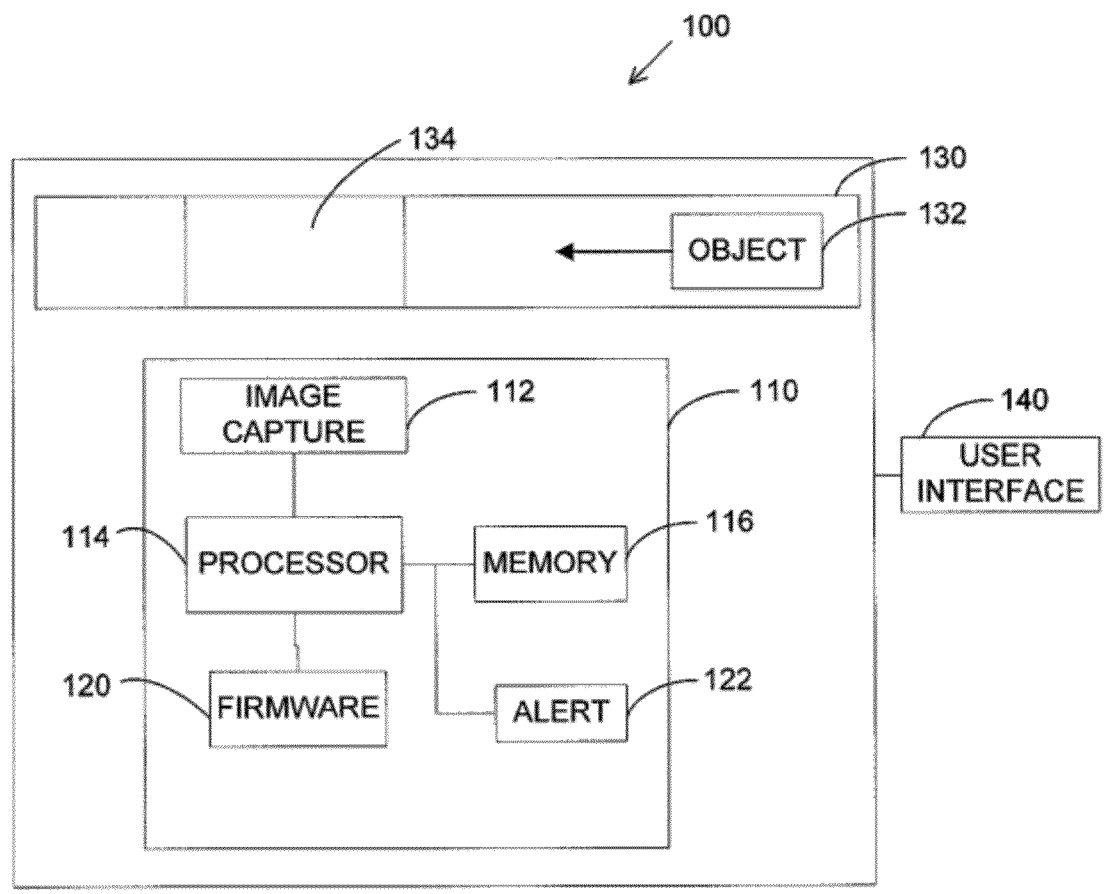
FIG. 1 is an image capture system for use with some embodiments of the invention.

FIG. 1 illustrates an exemplary image capture system 100 for use with some embodiments of the invention. In one embodiment, the image capture system 100 may be an inspection system comprising a camera 110 and a conveyor or moving stage 130. The camera 110 may be linescan camera, an area scan camera, or any other suitable type of camera for use with image capture system 100. The camera 110 comprises an image capture module 112, a processor 114 connected to the image capture module 112, and one or more storage devices such as memory 116. In some embodiments, the camera 110 comprises firmware 120 which contains one or more computer programs as discussed below.

In embodiments in which a linescan camera is contemplated, the image capture module 112 may comprise a lens, a light source, a capture window, and a row of photodetectors for acquiring a line image of an object 132. The object 132 may be placed on a conveyor 130 which moves to pass the object 132 through the field-of-view 134 of the camera 110. The image capture system 100 may additionally comprise a user interface 140 in which a user of the image capture system 100 may interact to adjust one or more user-configurable aspects (e.g., alert criteria as discussed below) of the image capture system 100. In some embodiments, the user interface 140 may include a display and one or more input keys for entering information related to the one or more user-configurable aspects. Although embodiments of the invention described below comprise a linescan camera, it should be appreciated that camera 110 may alternatively be an area scan camera, as embodiments of the invention are not limited in this respect. Furthermore, a camera in accordance with embodiments of the invention may be a grayscale camera or a color camera, as embodiments of the invention are not limited to any format of camera.

Figure 2:
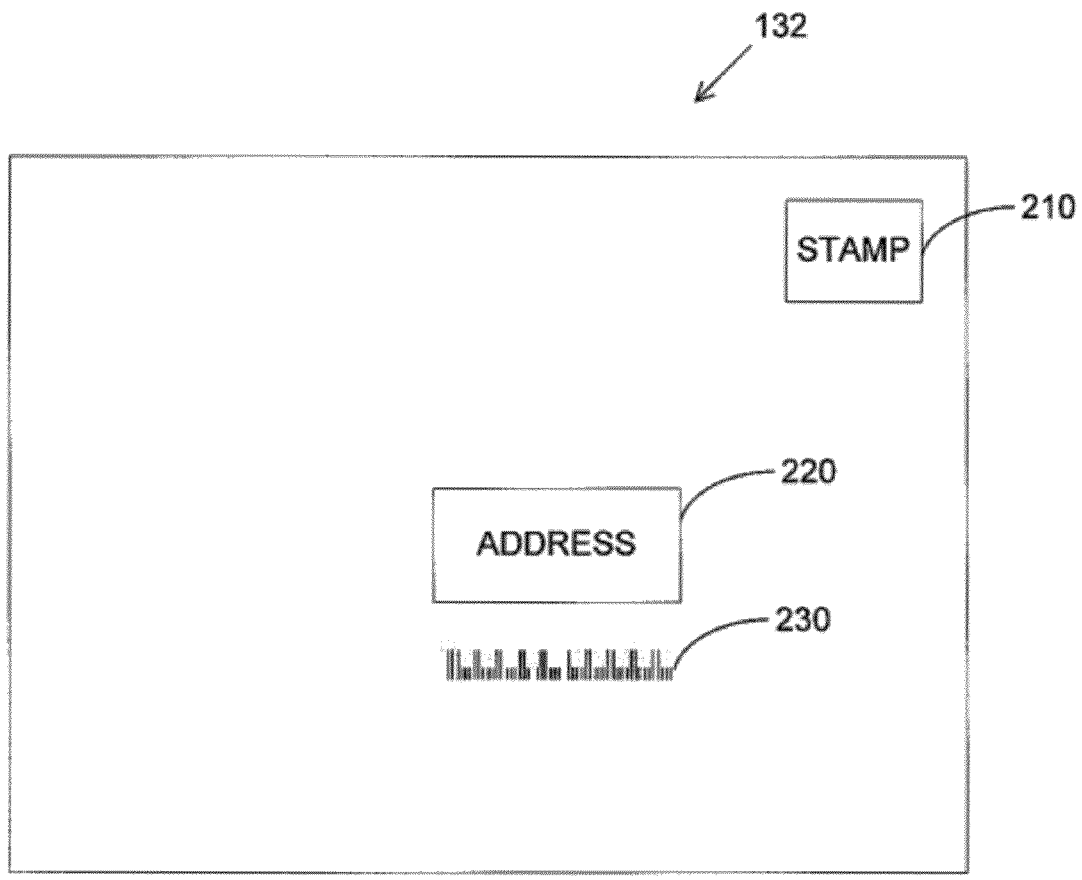
FIG. 2 illustrates an exemplary object that may be imaged by an image capture system in accordance with some embodiments of the invention.

Linescan cameras are often used in applications in which it is desirable to capture a large amount of data in a short period of time. One such application is the processing of mail by a mail sorting machine. In mail sorting, the object 132 may be a piece of mail as shown in FIG. 2. The piece of mail may comprise one or more areas which contain information to identify the mail piece. For example, the mail piece may include a stamp area 210, an address area 220, and a delivery bar code 230. The mail piece may additionally comprise one or more other graphical areas such as designs, logos, etc. In conventional mail processing machines, the piece of mail may be placed on the conveyor 130 and the mail may be imaged as it passes through the field of view 134 of the camera 110. The piece of mail may be imaged to read, for example, the delivery bar code 230 imprinted on the piece of mail. In some aspects, the delivery bar code 230 identifies the delivery location of the piece of mail, so that the mail processing machine sorts the mail based on the destination of each mail piece.

The one or more storage devices in camera 110 may be implemented in any way, as embodiments of the invention are not limited in this respect. For example, memory 116 may be implemented as a solid state drive (e.g., incorporating random access memory (RAM)), a flash memory, a hard disk drive, or any other type of storage device. Any or all of the storage devices in camera 110 may comprise one or more computer programs which include instructions that when executed by the processor 114, may analyze at least a portion of the image(s) collected by the image capture module 112. For example, in a linescan camera, firmware 120 may be configured to process line images as they are acquired by the image capture module 112. Alternatively, images or portions of images acquired by the image capture module 112 may be processed by one or more software programs stored on the memory 116 and executed on the processor 114. It should be appreciated that computer programs stored in firmware 120 or as software programs in the memory 116 may be implemented in any way using any suitable programming language, and aspects of embodiments of the invention are not limited in this respect.

The camera 110 further comprises an alert sensor 122 which indicates to a user of the image capture system 100 that the quality of images captured by the camera 110 is degraded and accordingly, that the camera 110 requires maintenance to improve the image quality. The alert sensor 122 may be implemented as a light-emitting diode (LED) or other such indicator on the camera 110 to clearly identify to the user that a degraded image quality has been detected. Alternatively, the alert sensor 122 may be incorporated as a portion of the user interface 140 presented to a user of the image capture system 100, or the alert sensor 122 may be implemented in any other suitable way. In some aspects, after at least a portion of an image has been captured and analyzed, one or more signals may be sent from the processor 114 to the alert sensor 122 to change the state of the sensor if the quality of the captured image is determined to be degraded.

Figure 3:
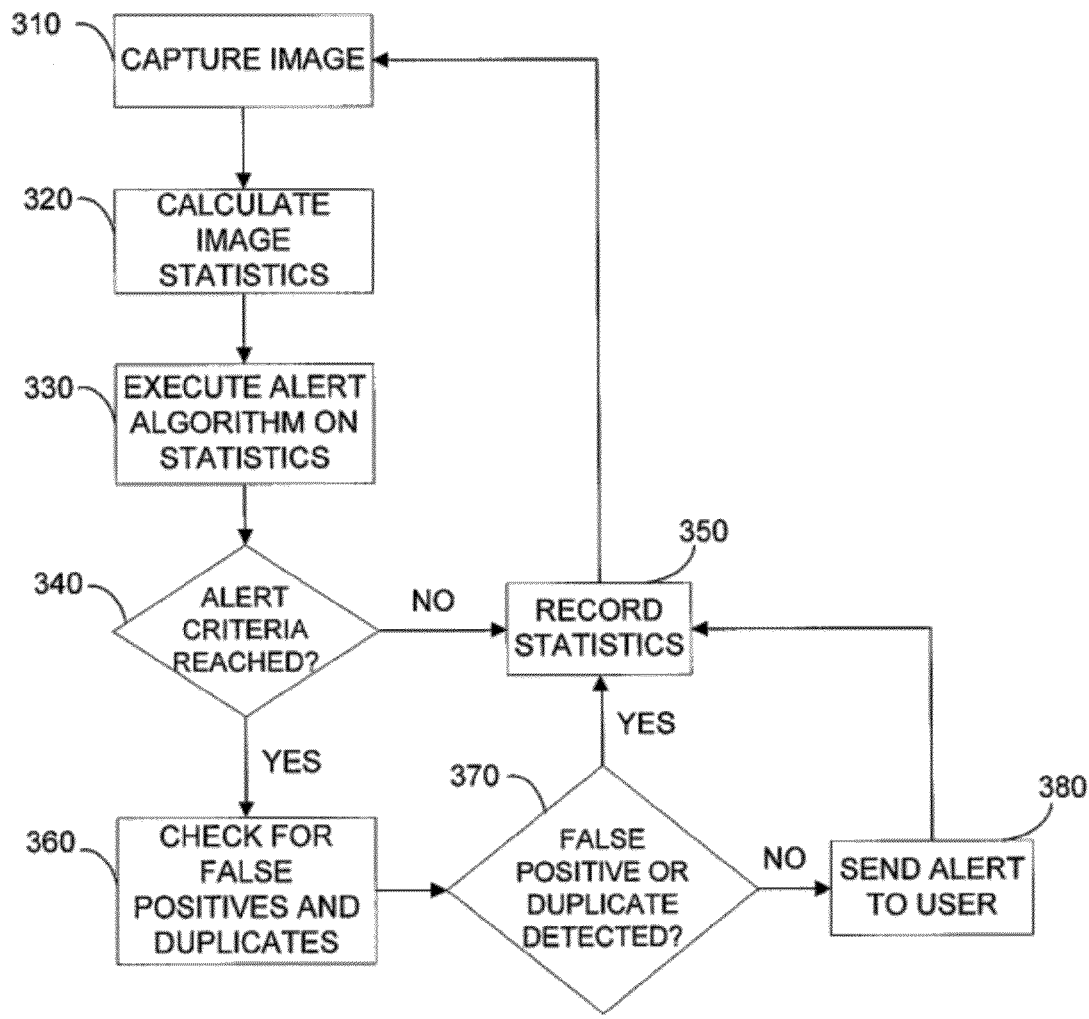
FIG. 3 is flow chart of a process for image quality detection according to some embodiments of the invention.

FIG. 3 illustrates a exemplary process for the operation of image capture system 100 according to some embodiments of the invention. As described above, objects 132 such as pieces of mail may be transported through a field-of-view 134 of the camera 110 to allow for imaging of the object. In act 310, at least a portion of the object is imaged by the camera intensity values for pixels in the acquired image are stored in at least one of the storage devices in the camera. In embodiments where the camera 110 is a linescan camera, the captured image may be a line image which may be stored in memory 116 or firmware 120. Processing of line images according to various embodiments is discussed below with reference to FIG. 4.

After capturing at least a portion of an image of an object in act 310, processor 114 may execute a computer program comprising a series of instructions in act 320 to calculate one or more image statistics (e.g. average and variance of intensity values) from the acquired image. It should be appreciated that the computer program used to calculate the image statistics may be implemented as software, firmware, or some combination. After calculating at least some image statistics in act 320, the processor 114 may execute an alert algorithm in act 330 to determine if the image quality of the acquired image is significantly degraded relative to a predetermined alert criterion. Examples of suitable alert algorithms for use with some embodiments of the invention are described in detail below. As with the computer program(s) which calculate the image statistics in act 320, computer program(s) for determining in act 330 if alert criteria are satisfied may be implemented in software, firmware, or some combination, as embodiments of the invention are not limited in this respect.

The result of executing an alert algorithm in act 330 leads to a determination in act 340 as to whether or not an alert criterion (or criteria) has been satisfied. If the result of the alert algorithm indicates that the alert criterion has not been satisfied, then the statistics calculated in act 320 are recorded in act 350, and a new image may be acquired by the camera. The statistics may be stored in any suitable manner in one or more of the storage devices in the camera, as embodiments of the invention are not limited in this respect. For example, the statistics calculated for the current image and one or more previous images may be stored in a data structure in firmware 120 or memory 116, such that the stored statistical values for the images are readily accessible to the processor 114 during subsequent iterations of the process illustrated in FIG. 3.

If it is determined in act 340 that the quality of the image acquired by the camera is degraded (i.e., the alert criteria has been reached), and alert is triggered. Then, in act 360, it is determined if the triggered alert is a false positive alert or a duplicate alert (e.g., from a previously acquired image). Applicants have recognized and appreciated that one of the challenges of detecting a blocked field-of-view in an image capture system is to minimize and/or eliminate duplicate and false positive alerts. Accordingly, in some embodiments, a history of the region of the image that triggered an alert may be stored and used as a basis for determining if the current alert is a duplicate. In other embodiments, known factors that cause false positive alerts are taken into consideration when determining if, in fact the alert triggered by the current image is a false positive alert. For example, applicants have identified that illumination degrades at the edges of an image. Thus, in some embodiments, the portions of an image close to the periphery of the object (e.g., within 10 pixels of the edge of the image) are not considered in calculating the statistics in act 320. Additionally, in some embodiments, objects may be profiled such that certain areas of the object known to be prone to triggering false positive alerts, and which are not necessary for proper identification of the object, may be ignored in the statistical calculations. Other methods of reducing the number of false positive alerts are also contemplated and are described in more detail below. It should be appreciated that any or all of the algorithms or methods for determining if the current alert is a duplicate or false positive alert may be implemented in any suitable way in software, hardware, and/or firmware, as embodiments of the invention are not limited in this respect.

In response to executing false positive and duplicate detection algorithms or methods in act 360, it is determined in act 370 if the current alert is a duplicate or a false positive alert. If a duplicate or false positive alert is detected, the image statistics for the currently acquired image are recorded in act 350, and a new image may be acquired by the camera. As described above, the image statistics may be stored in any way, as embodiments of the invention are not limited in this respect. If it is determined in act 370 that the alert is genuine (i.e., not a duplicate or a false positive), then an alert sensor is activated in act 380 to alert the user of the blocked field-of-view of the camera in the image capture system. As described above, the image capture system 100 may include an alert sensor 122 to which one or more signals generated by the processor 114 may be sent upon satisfaction and validation of the alert criteria. The alert may be transmitted to the user of the image capture system 100 in any suitable way, such as illuminating an LED or other light-emitting alert sensor 122 located on the camera 110 or some other portion of the image capture system 100, or by transmitting a message from the processor 114 to a user interface integrated as part of the image capture system 100. For example, in some embodiments, a pre-determined message may be stored in firmware or software on a storage device in the camera, and upon validation of an alert in act 360, the message may be transmitted to a user to indicate that a blocked field-of-view of the camera exists. The alert message may be transmitted in any suitable manner, such as via a network connection or otherwise, as embodiments of the invention are not limited in this respect. In addition to transmitting the alert to a user in act 380, the image statistics may be recorded in act 350 as described above, and additional images may be subsequently acquired and analyzed by the image capture system 100.

Figure 4:
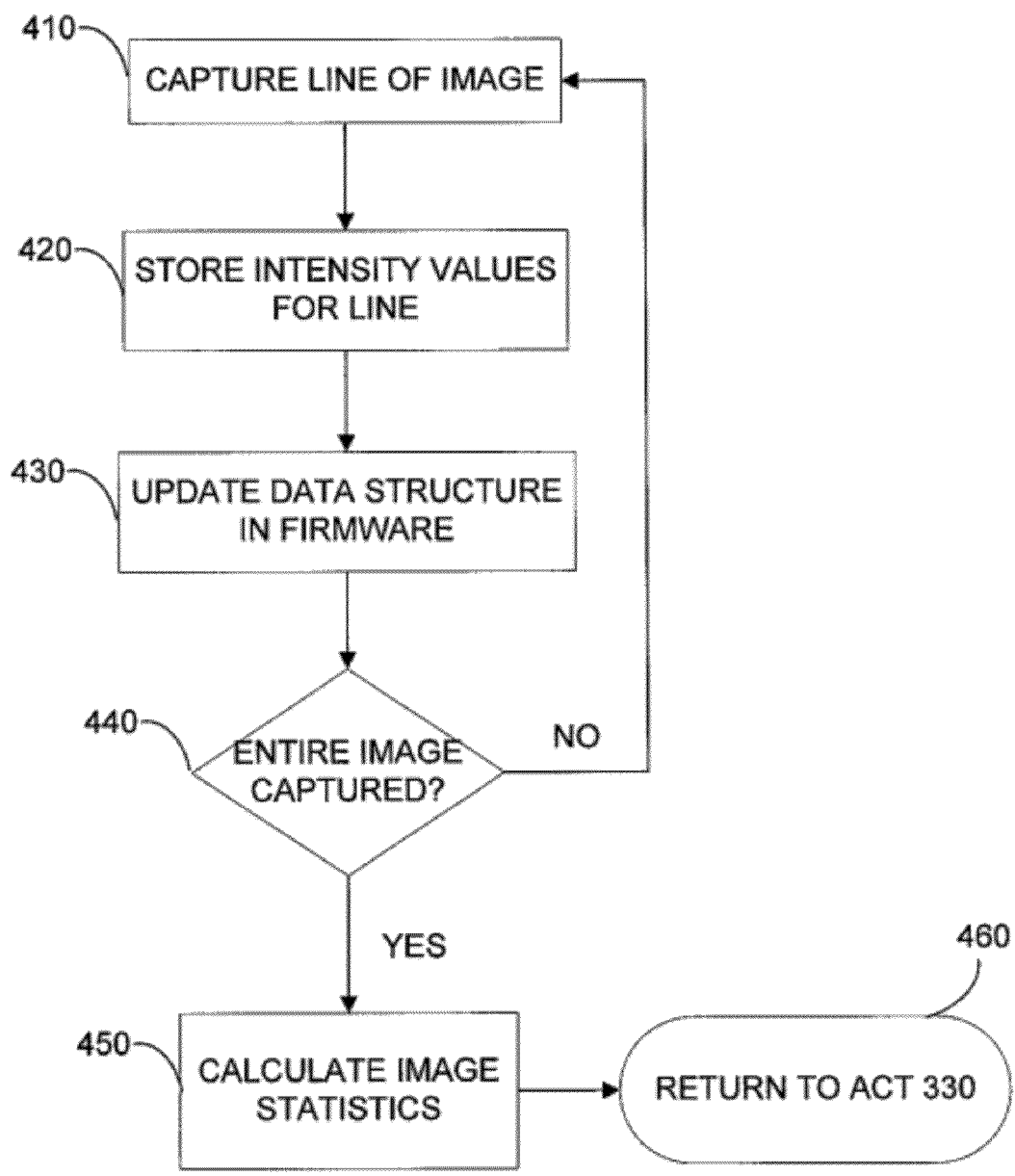
FIG. 4 is a flow diagram of a process for determining an image quality for an image captured by a linescan camera according to some embodiments of the invention.
Figure 5:
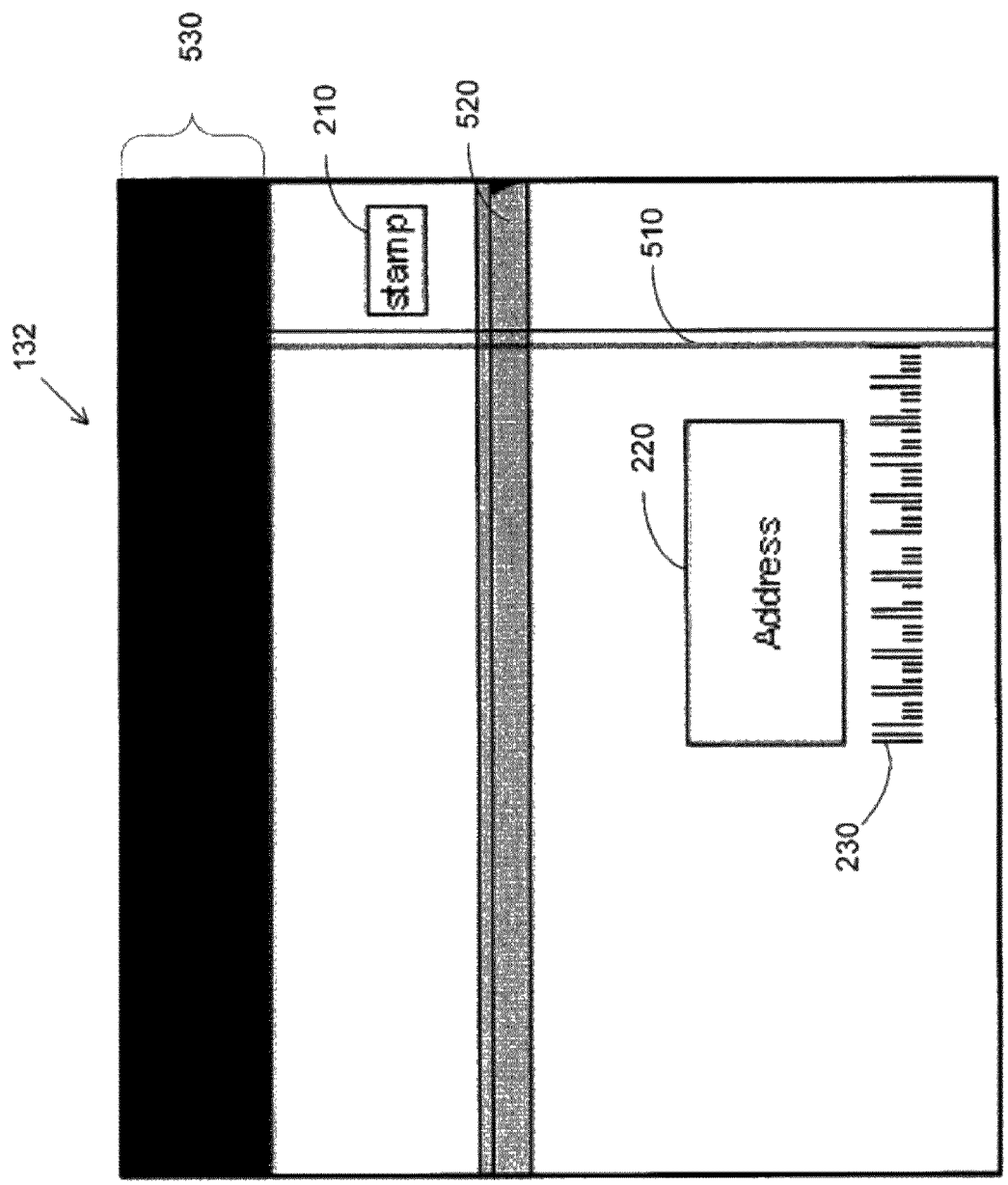
FIG. 5 illustrates areas of an exemplary object that may be imaged by an image capture system in accordance with some embodiments of the invention.

FIG. 4 illustrates an exemplary process for analyzing images captured from a linescan camera according to some embodiments of the present invention. FIG. 5 depicts an example of an object 132 (e.g., a piece of mail) that may be imaged using the process illustrated in FIG. 4 and described in detail below. In act 410, a linescan camera captures a line image 510 (see FIG. 5). A line of photodectectors in a linescan camera is oriented so as to capture a line image 510 that is one pixel wide and a plurality of pixels high. For example, in an exemplary mail scanning system, a linescan camera may acquire line images that are 1×1600 pixels, may capture 256 line images per inch of the object, and may acquire line images at a rate of 160 inches per second. After acquiring a line image 510 in act 410, the intensity values for each of the pixels in the line image may be determined in act 420. For example, each pixel in the line image 510 may be assigned a value ranging between 0-255 (e.g., with 0 indicating black, 255 indicating white, and values between 0 and 255 indicating various shades of gray) using an intensity mapping algorithm stored in firmware 120 or in some other storage device of camera 110. Alternatively, in embodiments comprising a color camera, the value assigned to each pixel in the line image 510 may represent a color characteristic (e.g., hue, saturation or value or HSV) associated with the pixel. Although HSV is one color model that may be used with embodiments of the invention that include a color camera, it should be appreciated that any other color model may also be used, as embodiments of the invention are not limited in this respect.

In act 430, the intensity values calculated in act 420 may be stored in a data structure in firmware 120 (or alternatively, in some other storage device). In some embodiments, the data structure may comprise an N×1600 array in which intensity values for each of the line images are stored. The pixels at the same height in each line image 510 form a "row" 520 of pixels (see FIG. 5) across the image (i.e., across all line images at the same height). In some embodiments, as each of the line images 510 are acquired, firmware 120 may calculate statistics for each row of pixels in the image. For example, firmware 120 may be configured to calculate an average intensity value for pixels in a row and a variance of intensity values for pixels in a row. The average intensity value and variance of intensity value for pixels in each row of the data structure may be stored in firmware 120 or a storage device (e.g., memory 116) in the camera 110. To reduce the amount of data that is stored and used for further calculations, in some embodiments, the averages and variances of intensity values from multiple rows 520 may be averaged. For example, in one embodiment, the averages and variances for each consecutive group of four rows 520 is averaged and stored, although more or fewer (including zero) number of rows may be averaged together, as embodiments of the invention are not limited in this respect. Averaging intensity values for a row 520 may be accomplished by adding the intensity values for pixels in the row and then dividing by the number of acquired pixels in the row (i.e., the number of acquired line images). The average intensity value for a row is an indication of the brightness of the row. For example, an average value of 0 indicates that all of the pixels in the row are black, and an average value if 255 indicates that all of the pixels in the row are white. In general, images tend to have pixel values in the range of 20-200 indicating varying degrees of gray (depending on desired calibration and other factors). Accordingly, the average intensity value for a row is typically in a similar range (i.e., 20-200).

Applicants have recognized and appreciated that pixels in an area of the image where obstructing objects such as dirt, debris, ink, etc. are present in the field-of-view 134 of the camera 110 will have artificially lower intensity values (i.e., it will appear that the pixels are darker). Thus, rows in areas of the image that include such obstructions may have a lower average intensity value compared to rows in areas of the image that do not contain obstructions. Accordingly, some embodiments of the invention are directed to methods and apparatus for detecting rows which have an abnormally low average intensity value as an indication that a blockage in the field-of-view 134 of the camera 110 is present.

In addition to calculating an average intensity value for each row, some embodiments of the invention may additionally calculate the variance of intensity values in a row (or consecutive groups of rows as discussed above for averaging). The variance of intensity values for pixels in a row indicates how much contrast the row contains (e.g., an image with high contrast will have a high variance), and contrast is a factor which contributes significantly to effective recognition processing and performance of an image capture system. The variance of intensity values for a row may be calculated using mean of the squares and squares of the mean calculations in firmware (or software).

After processing and storing the values for one line image 510 in act 430, it may be determined in act 440 if the entire image of the object 132 has been captured by the image capture system 100. If the entire image has not been captured, then more line images 510 are acquired, processed, and stored, until it is determined in act 440 that the entire image of the object 132 has been captured. After it has been determined that the entire image has been acquired in act 440, the averages and variances calculated and stored for the current image are combined in act 450 with averages and variances calculated for previously captured images to determine if there has been a significant degradation in the image quality (e.g., in one or more areas of the image).

In one embodiment, computer programs stored in firmware 120 may calculate a new array of averages and variances Y according to the following formula:

$$Y = X*\delta + X_1(1-\delta),$$

where X is a prior array of averages and variances (e.g., history), $X_1$ is the array of averages and variances for the currently captured image, and $\delta$ is a weighting factor. Using this formula, Y then becomes X for the next iteration (i.e., the current array is factored into the prior array when the next image is captured). The value $\delta$ may be a decimal value between 0 and 1, which is user-configurable and determines the weighting given to previously captured images as compared to the currently acquired image. For example, if $\delta=0.9$, then all previously captured images are given 90% weight to influence when an alert should be triggered.

Applicants have recognized that the first captured image will not have any values for previously captured images. Thus, the prior array X may be initialized using suitable values, for example, 240 for average and 1000 for variance, since these values indicate an image that has a light intensity with high contrast. It should be appreciated that different initialization values may alternatively be used, as embodiments of the invention are not limited in this respect. After the average and variance values for the currently acquired image are combined with statistics calculated for previously acquired images in act 450, processing may proceed to act 340 in FIG. 3 to determine if any alert criteria have been satisfied.

Although the aforementioned calculations have been described as being computed in firmware, some or all of the image analysis calculations may alternatively be implemented in software, and aspects of embodiments of the invention are not limited in this respect. It should also be appreciated that statistics other than, or in addition to, average and variance of intensity values in an image may also be used to detect a degraded image quality, as embodiments of the invention are not limited in this respect. Furthermore, whereas the image analysis calculations (e.g., average and variance) above are computed for rows of an image, it should be appreciated that similar calculations may also be performed for the columns of an image (e.g., if the line images of the object were captured in a horizontal plane rather than in a vertical plane).

Although the entire field of view may be considered in image analysis calculations, applicants have recognized and appreciated that some objects vary in their height (e.g., envelopes of different sizes). Thus, in some embodiments, a detected height (i.e., a cropped height) may be obtained, and the rows above the cropped height (i.e., rows 530 in FIG. 5) may not be used in that iteration of the image analysis calculations. The detected height may be user-configurable, and may be set at, for example, the height of a standard size greeting card envelope, although other detected heights are also possible.

In some embodiments, thresholds at which alerts are triggered may be user configurable (e.g., via user interface 140), and the alert criteria may utilize the averages only, the variances only, or a combination of both measures. Additionally, a user may set multiple alert criteria, such that more than one set of circumstances may trigger an alert to be sent to the user. For instance, the user may request an alert when the average intensity values for 10 consecutive rows in an image fall below 80 (i.e., the detected image is getting too dark), and an additional alert when the average intensity value for 10 consecutive rows falls below 100 and the variance for the same 10 consecutive rows falls below 90 (i.e., image contrast is also deteriorating). It should be appreciated that the optimal settings may be application-specific and may be determined using an iterative process or other methods, as creating thresholds that are too stringent may result in too few alerts being triggered, whereas thresholds that are too relaxed may result in too many false positive alerts being triggered. One way to mitigate the challenge in selecting appropriate alert criteria, yet still allowing for relatively relaxed thresholds may be to control the number of false positive alerts by using additional information acquired by the image capture system.

In addition to the aforementioned methods of detecting false positive alerts (e.g., ignoring certain areas of the object not used for object recognition, etc.), other methods may also be used to inform the detection process. For example, in some embodiments, images may be captured without any object present in the camera's field of view. Applicants have recognized that this approach may be particularly beneficial for detecting trapped paper flecks (or other such small objects) that may obscure the capture window of the camera and may exhibit a blockage that has a predominantly reverse contrast (i.e., light on a dark background).

Figure 6:
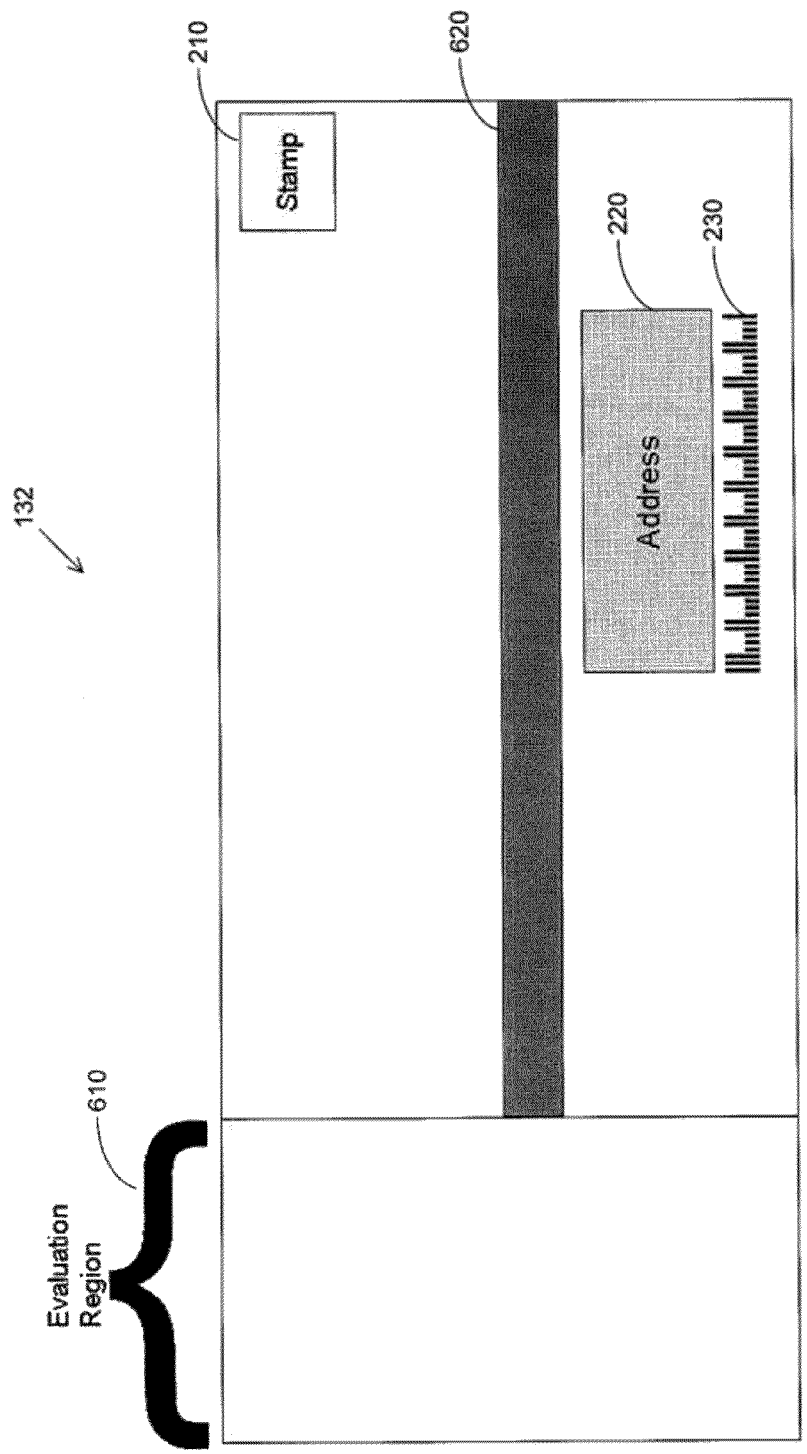
FIG. 6 illustrates an extended portion of an image of an object that may be used to detect a false positive alert in accordance with some embodiments of the invention.

As described above with reference to FIG. 3, and as illustrated in FIG. 6, an object 132 (e.g., apiece of mail) may comprise multiple areas including a stamp area 210, and address area 220, and a delivery barcode 230. However, applicants have recognized and appreciated that some objects may also include designs or markings such as stripe 620, which may trigger a false positive alert (e.g., because it is dark and has a low contrast). To identify false positive alerts due at least in part to one or more markings on the object (rather than due to a blocked field of view of the camera), in some embodiments of the invention, an image capture system may acquire an image that is larger than the actual image of the object. In this method, images are captured of areas (i.e., "evaluation regions") between objects on the conveyor 130 and these images are compared to images acquired for the preceding object. One or more inconsistencies detected between an evaluation region 610 and the actual image of the object 132 provide evidence of a false positive alert. In the example of FIG. 6, an object 132 contains a stripe 620 and an evaluation region 610 adjacent to the object 132 does not contain the stripe. A comparison of images of the evaluation region 610 and the object 132 allows for the detection of inconsistencies. For example, the absence of the stripe 620 in the evaluation region image signifies that an alert triggered by an image of the object 132 may have been erroneously caused by markings on the object 132 (i.e., stripe 620) and not by a blocked field-of-view of the camera. Image comparisons may be performed in any suitable way, as embodiments of the invention are not limited in this respect. For example, in some embodiments, the evaluation region 610 may be analyzed in a similar manner as the image of object 132 by calculating averages and variances of the intensity values of the evaluation region image, and the calculated averages and variances for the evaluation region image and the object image may be compared.

In some embodiments, one or more trigger points (e.g., regions of an image) for an alert generated based on the image of object 132 may be compared with an alert trigger point (if any) generated by analysis of the image of the evaluation region 610. A match of the two alert trigger points may signify the existence of an obstruction in the field-of view of the camera. Otherwise, the alert may be considered as a false positive alert due to a marking on the object 132, and the alert is ignored. It should be appreciated that stripe 620 shown on the object 132 in FIG. 6 is only one example of a type of marking on an object that may trigger a false positive alert, and detection of other types of markings and designs for determining false positive alerts are also contemplated by embodiments of the invention.

In some embodiments, when an alert is sent to a user, at least some information associated with the alert may be stored in a logfile on the image capture system (or elsewhere). By recording the occurrences of generated alerts, users may be able to identify certain image capture systems which are more prone to blockages of the field-of-view of a camera in the image capture systems, and additional maintenance may be required on such image capture systems to prevent the reoccurrence of at least some of the blockages.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software, firmware, or a combination thereof When implemented in firmware or software, the instructions contained therein can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of detecting a change in a quality of images captured by a linescan camera, the method comprising acts of:
   (A) storing, in at least one first data structure, first intensity values determined for pixels in a first image of at least one object acquired by the linescan camera;
   (B) calculating at least one first statistic based at least in part on at least some of the first intensity values stored in the at least one first data structure;
   (C) calculating at least one second statistic based at least in part on the at least one first statistic and at least one third statistic previously stored on the linescan camera; and
   (D) triggering an alert when the at least one second statistic satisfies at least one predetermined alert criterion.

2. The method of claim 1, wherein calculating the at least one second statistic comprises multiplying the at least one third statistic by a weighting factor.

3. The method of claim 1, wherein the at least one first statistic includes at least one of an average intensity value for at least one row of pixels in the first image and a variance of intensity values for the at least one row of pixels in the first image.

4. The method of claim 1, wherein the act of triggering an alert further comprises determining if the alert is a duplicate alert or a false positive alert.

5. The method of claim 4, wherein determining if the alert is the false positive alert comprises acquiring a third image and comparing at least a portion of the third image with at least a portion of the first image, wherein the third image does not contain the at least one object.

6. The method of claim 1, wherein calculating the at least one first statistic comprises excluding at least some of the first intensity values.

7. The method of claim 6, wherein calculating the at least one first statistic comprises excluding the first intensity values for pixels close to the periphery of the first image.

8. The method of claim 1, wherein the at least one predetermined alert criterion includes an criterion based on an average intensity value and a variance in intensity values.

9. The method of claim 1, further comprising the act:
   (E) storing in at least one second data structure the at least one second statistic.

10. A non-transitory computer readable medium encoded with a series of instructions that when executed on a computer, perform a method, the method comprising:
   storing, in at least one data structure, first intensity values determined for pixels in a first image of at least one object acquired by a linescan camera;
   calculating at least one first statistic based at least in part on at least some of the first intensity values stored in the at least one data structure;
   calculating at least one second statistic based at least in part on the at least one first statistic and at least one third statistic previously stored on the linescan camera; and
   triggering an alert upon determining that the at least one second statistic satisfies at least one predetermined alert criterion.

11. The non-transitory computer readable medium of claim 10, wherein the at least one data structure comprises an array having a plurality of rows and a plurality of columns, and wherein the at least one predetermined alert criterion includes a criterion based on at least one of an average intensity value in at least two adjacent rows of the plurality of rows or at least two adjacent columns of the plurality of columns and a variance in intensity values in at least two adjacent rows of the plurality of rows or at least two adjacent columns of the plurality of columns.

12. The non-transitory computer readable medium of claim 10, wherein calculating the at least one first statistic comprises excluding the first intensity values for pixels close to the periphery of the first image.

13. The non-transitory computer readable medium of claim 10, wherein the alert is deleted upon determining that the alert is a duplicate alert or a false positive alert.

14. The non-transitory computer readable medium of claim 10, wherein at least a portion of the at least one first statistic is calculated prior to acquisition of the entire first image.

15. An image capture system including at least one camera, the at least one camera comprising:
   an image capture module for acquiring at least one image of at least one object;
   at least one storage medium for storing at least one data structure;
   an alert sensor for receiving an alert message and displaying an alert; and
   at least one processor programmed to:
      store, in the at least one data structure, first intensity values determined for pixels in a first image acquired by the image capture module;
      calculate at least one first statistic based at least in part on at least some of the first intensity values stored in the at least one data structure;

calculate at least one second statistic based at least in part on the at least one first statistic and at least one third statistic previously stored on the at least one storage medium; and transmit the alert message to the alert sensor in response to determining that the at least one second statistic satisfies at least one predetermined alert criterion.

16. The image capture system of claim 15, wherein at least one computer program is implemented in firmware and at least a portion of the at least one first statistic is calculated prior to acquiring the entire first image.

17. The image capture system of claim 15, further comprising a conveyor for transporting the at least one object past a field-of-view of the image capture module.

18. The image capture system of claim 15, wherein the image capture system is a mail sorting apparatus and the at least one object includes a piece of mail.

19. The image capture system of claim 15, wherein the alert sensor is a sensor which emits light in response to receiving the alert message.

20. The image capture system of claim 15, wherein the alert sensor is a user interface comprising a display, and wherein the alert message is presented on the display of the user interface in response to receiving the alert message.

* * * * *